United States Patent Office 3,213,140
Patented Oct. 19, 1965

3,213,140
2-PHENYL-4,6-DICHLOROPHENOXYETHYL-AMINE AND SALTS THEREOF
Jack Mills, Glenns Valley, Ind., assignor to Eli Lilly and Company, Indianapolis, Ind., a corporation of Indiana
No Drawing. Filed Sept. 6, 1960, Ser. No. 53,909
2 Claims. (Cl. 260—570.7)

This invention relates to novel substituted phenoxyethylamines and to their acid addition salts.

The compounds provided by this invention comprise the phenoxyethylamine bases represented by the following formula:

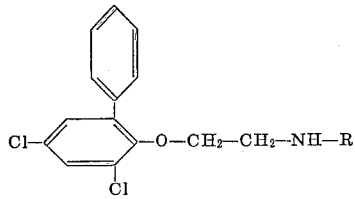

wherein R is hydrogen or methyl, and the nontoxic pharmaceutically acceptable acid addition salts thereof.

By "nontoxic pharmaceutically acceptable acid addition salts" is meant the reaction products of nontoxic acids and the above amines to form salts whose mammalian toxicity is not substantially greater than the toxicity of the amine base itself. Among nontoxic acids useful for forming these pharmaceutically acceptable acid addition salts are both inorganic and organic acids; for example, hydrochloric acid, sulfuric acid, phosphoric acid, hydrobromic acid, maleic acid, cinnamic acid, benzoic acid, tartaric acid, succinic acid, and the like.

The amine bases of this invention are heavy, viscous oils, whereas their acid addition salts are white, crystalline solids soluble in water and polar organic solvents. The amine bases themselves can suitably be prepared as follows: 2-phenyl-4,6-dichlorophenol (I) is reacted with ethyl chloroacetate in the presence of sodium ethoxide to form the ethyl ester of 2-phenyl-4,6-dichlorophenoxyacetic acid (II). The ester is then reacted with either ammonia or methylamine to form the corresponding amide (III), which upon reduction with lithium aluminum hydride yields the desired amine base (IV). Alternatively, 2-phenyl-4,6-dichlorophenol (I) can be reacted with ethylene dibromide in the presence of sodium hydroxide to form 2-phenyl-4,6-dichlorophenoxyethyl bromide (V). Reaction of this compound with either ammonia or methylamine again yields the desired amine base.

The above reaction sequence are graphically illustrated below in Chart I. In the chart, R has the same significance as hereinabove.

CHART I

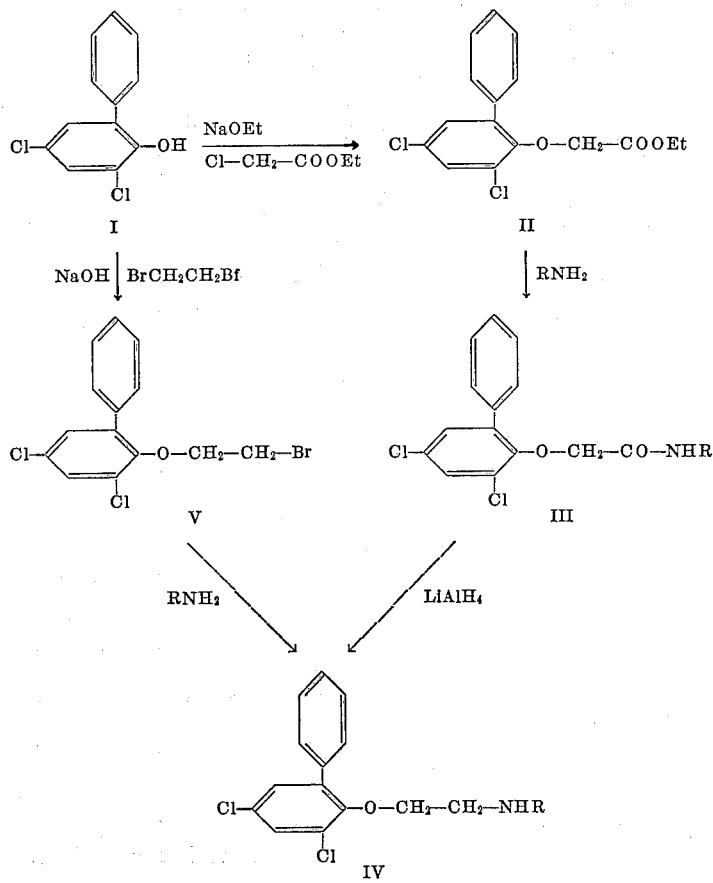

The compounds of this invention, either in the form of the free bases or as nontoxic pharmaceutically acceptable acid addition salts of the free bases, inhibit the metabolism of drugs and can thus act as drug-prolonging and potentiating agents. For example, they prolong barbiturate-induced sleep in mammals. They also potentiate the analgesic activity of morphine by inhibiting in vivo the metabolic demethylation of that compound. Furthermore, they potentiate the insectidal activity of carbamate insecticides, as for example, N-methyl α-naphthyl carbamate.

This invention is further illustrated by the following specific examples:

EXAMPLE 1

*Preparation of 2-phenyl-4,6-dichlorophenoxyethylamine*

239 g. of 2-phenyl-4,6-dichlorophenol were added to one liter of anhydrous ethanol containing 1.1 moles of sodium ethoxide, thus forming the sodium salt of the phenol. To the resulting mixture, at reflux temperature, were added 122 g. of ethyl chloroacetate in dropwise fashion. After the addition had been completed, refluxing was continued for 14 additional hours. The reaction mixture was cooled and filtered to remove any sodium chloride formed in the reaction, and the filtrate was evaporated to dryness in vacuo. The residue, containing ethyl 2-phenyl-4,6-dichlorophenoxyacetate formed in the above reaction, was dissolved in benzene. The benzene solution was washed with two 100-ml. portions of 10 percent sodium hydroxide in order to remove any unreacted phenol. The benzene layer was next washed with 100 ml. of 10 percent hydrochloric acid followed by 100 ml. of water. The benzene layer was separated and dried, and the benzene was removed by distillation. The residue, comprising ethyl 2-phenyl-4,6-dichlorophenoxyacetate, was distilled. It boiled in the range 140–150° C. at a pressure of about 0.07 mm. of mercury; $n_D^{25}=1.576$.

75 g. of ethyl 2-phenyl-4,6-dichlorophenoxyacetate and a large excess of ammonia (500 ml.) in 100 ml. of ethanol were heated in an autoclave at 120° C. for about 6 hours. The reaction mixture was cooled and was filtered. Part of the 2-phenyl-4,6-dichlorophenoxyacetamide thus formed precipitated and was collected by filtration. The filtrate was evaporated to dryness, yielding a further quantity of the amide. Recrystallization of the combined solids from benzene-hexane solvent mixture yielded 55 g. of 2-phenyl-4,6-dichlorophenoxyacetamide melting at about 127–130° C.

55 g. of 2-phenyl-4,6-dichlorophenoxyacetamide were suspended in 200 ml. of anhydrous ether. This suspension was added with stirring to a mixture of 8.3 g. of lithium aluminum hydride in 500 ml. of anhydrous ether, After the addition had been completed, the reaction mixture was stirred for an additional hour. To the mixture were then successively added 8.7 ml. of water, 6.0 ml. of 20 percent sodium hydroxide, and 30.2 ml. of water. The ether layer was separated by decanting, and the separated layer was washed with 100 ml. of 10 percent hydrochloric acid, thus converting the 2-phenyl-4,6-dichlorophenoxyethylamine therein to its hydrochloride salt, which dissolved in the acidic layer. The acidic aqueous layer was made alkaline with an excess of 10 percent sodium hydroxide, thus forming 2-phenyl-4,6-dichlorophenoxyethylamine free base, which was extracted with ether. The ether layer was washed with 200 ml. of water and dried, and the ether was removed by evaporation in vacuo. Distillation of the residue yielded purified 2-phenyl-4,6-dichlorophenoxyethylamine, which distilled in the range 150–160° C. at a pressure of 1 mm. of murcury. The distilled free base was dissolved in ether, and anhydrous gaseous hydrogen chloride was bubbled into the ether solution, thus forming 2-phenyl-4,6-dichlorophenoxyethylamine hydrochloride, which melted at about 171–173° C. after recrystallization from an ethanol-ether solvent mixture.

*Analysis.*—Calc.: C, 52.76; H, 4.42. Found: C, 53.17; H, 4.76.

EXAMPLE 2

*Preparation of N-methyl 2-phenyl-4,6-dichlorophenoxyethylamine*

Following the procedure of Example 1, 50 g. of ethyl 2-phenyl-4,6-dichlorophenoxyacetate were reacted with a large excess of methylamine in ethanol in an autoclave at 120° C. for six hours. N-methyl 2-phenyl-4,6-dichlorophenoxyacetamide thus formed was isolated and purified by the method of Example 1. It melted at about 130–133° C.

Following the procedure of Example 1, 30 g. of the N-methyl 2-phenyl-4,6-dichlorophenoxyacetamide in anhydrous benzene solution were reduced with 6.8 g. of lithium aluminum hydride in ether to form N-methyl 2-phenyl-4,6-dichlorophenoxyethylamine, which distilled in the range 145–150° C. at a pressure of about 1 mm. of mercury; $n_D^{25}=1.593$.

N-methyl z - phenyl - 4,6 - dichlorophenoxyethylamine thus prepared was converted to its hydrochloride salt by the method of Example 1. N-methyl 2-phenyl-4,6-dichlorophenoxyethylamine hydrochloride melted at about 148–150° C. after recrystallization from a mixture of ethanol and ether.

*Analysis.*—Calc.: C, 54.75; H, 4.84. Found: C, 54.86; H, 4.82.

EXAMPLE 3

*Alternative preparation of 2-phenyl-4,6-dichlorophenoxyethylamine*

A mixture of 239 g. of 2-phenyl-4,6-dichlorophenol, 376 g. of ethylene dibromide and 800 ml. of water was heated to refluxing temperature. A solution of 40 g. of sodium hydroxide in 250 ml. of water was added dropwise to the refluxing reaction mixture over a four-hour period. After the addition had been completed, heating was continued for another sixteen hours. The reaction mixture was cooled and was diluted with one liter of ether. The ether layer was separated and washed three times with 300-ml. portions of 10 percent sodium hydroxide and once with 300 ml. of water. The ether layer was dried, and the ether was removed by evaporation in vacuo. The resulting residue comprising 2-phenyl-4,6-dichlorophenoxyethyl bromide formed in the above reaction was purified by distillation. It boiled in the range 160–165° C. at a pressure of about 0.5 mm. of mercury; $n_D^{25}=1.615$.

30 g. of 2-phenyl-4,6-dichlorophenoxyethyl bromide were reacted with 500 ml. of ammonia in 200 ml. of ethanol at about 160° C. for about six hours in an autoclave. The product mixture was removed from the reaction vessel, and the volatile constituents were evaporated in vacuo. The residue was treated with a mixture of 100 ml. of 10 percent aqueous sodium hydroxide solution and 200 ml. of ether. The ether layer was separated and was extracted twice with 200 ml. of 10 percent hydrochloric acid and once with 100 ml. of water. The acidic and aqueous extracts were combined, and the combined extracts were made alkaline by the addition of an excess of 20 percent sodium hydroxide. The organic bases were taken up in ether, and the ether layer was separated, washed with 200 ml. of water, and dried. The ether was removed by evaporation in vacuo, and the residue was purified by distillation. The 2-phenyl-4,6-dichlorophenoxyethylamine thus obtained boiled at about 135–140° C. at a pressure of 0.1 mm. of mercury; $n_D^{25}=1.603$.

EXAMPLE 4

*Alternative preparation of N-methyl 2-phenyl-4,6-dichlorophenoxyethylamine*

Following the procedure of Example 3, 50 g. of 2-phenyl-4,6-dichlorophenoxyethyl bromide were reacted with a large excess of methylamine in ethanol solution in a pressure bottle at about 160° C. N-methyl 2-phenyl-4,6-dichlorophenoxyethylamine was isolated by the procedure of Example 3 and was purified by distillation. It boiled at about 145–155° C. at a presure of about 0.5 mm. of mercury; $n_D^{25}=1.592$.

I claim:
1. 2-phenyl-4,6-dichlorophenoxyethylamine.
2. 2-phenyl-4,6-dichlorophenoxyethylamine hydrochloride.

References Cited by the Examiner
UNITED STATES PATENTS 2,773,900  12/56  Mills _____ 260—570.7

OTHER REFERENCES

McMahon et al.: "Abstracts of Papers," American Chemical Society 138th Meeting, page 48-O, received August 15, 1960.

CHARLES B. PARKER, *Primary Examiner.*

LEON ZITVER, IRVING MARCUS, *Examiners.*